US009320071B2

(12) United States Patent
Tanaka et al.

(10) Patent No.: US 9,320,071 B2
(45) Date of Patent: Apr. 19, 2016

(54) COMMUNICATION SYSTEM, MOBILE STATION, AND COMMUNICATION METHOD (71) Applicant: NTT DOCOMO, INC., Tokyo (JP)

(72) Inventors: Itsuma Tanaka, Tokyo (JP); Masato Tachiki, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 95 days.

(21) Appl. No.: 14/382,153

(22) PCT Filed: Feb. 26, 2013

(86) PCT No.: PCT/JP2013/054874
§ 371 (c)(1),
(2) Date: Aug. 29, 2014

(87) PCT Pub. No.: WO2013/129365
PCT Pub. Date: Sep. 6, 2013

(65) Prior Publication Data
US 2015/0063235 A1 Mar. 5, 2015

(30) Foreign Application Priority Data
Mar. 1, 2012 (JP) .................. 2012-045977

(51) Int. Cl.
*H04W 76/02* (2009.01)
*H04W 36/00* (2009.01)
(Continued)

(52) U.S. Cl.
CPC ........ *H04W 76/025* (2013.01); *H04W 36/0011* (2013.01); *H04W 76/027* (2013.01); *H04W 36/14* (2013.01); *H04W 48/18* (2013.01); *H04W 80/04* (2013.01); *H04W 88/06* (2013.01)

(58) Field of Classification Search
CPC . H04W 36/0022; H04W 36/14; H04W 88/06; H04W 36/0066; H04L 65/1016; H04L 65/1083
See application file for complete search history.

(56) References Cited

U.S. PATENT DOCUMENTS

2005/0227719 A1   10/2005   Gunaratnam et al.
2010/0284267 A1*  11/2010  Domingguez Romero
                             et al. ................... H04W 76/027
                                                370/216

(Continued)

FOREIGN PATENT DOCUMENTS

JP      2005-094228 A    4/2005
JP      2009-253561 A    10/2009
JP      2010-045428 A    2/2010

OTHER PUBLICATIONS

3GPP TS 24.229 V11.2.1; "3rd Generation Partnership Project; Technical Specification Group Core Network and Terminals; IP multimedia call control protocol based on Session Initiation Protocol (SIP) and Session Description Protocol (SDP); Stage 3 (Release 11)"; Jan. 2012 (716 pages).

(Continued)

*Primary Examiner* — Jung Park
(74) *Attorney, Agent, or Firm* — Osha Liang LLP (57) ABSTRACT

A UE 100 is connectable to an IP-CAN conforming to Internet protocol via any one of LTE supporting a service conforming to an IP multimedia subsystem and 3G not supporting the service conforming to the IP multimedia subsystem. In a case where the UE 100 receives a connection rejection notification from a SGSN capable of communicating with the IP multimedia subsystem after transitioning from LTE to 3G, the UE 100 suspends transmission of a request for reconnection to the IP access network only if the mobile station is camping in 3G through which the connection rejection notification has been received. Here, the connection rejection notification indicates that the UE 100 is not connectable to the IP multimedia subsystem.

10 Claims, 4 Drawing Sheets (51) Int. Cl.
| | |
|---|---|
| H04W 36/14 | (2009.01) |
| H04W 48/18 | (2009.01) |
| H04W 80/04 | (2009.01) |
| H04W 88/06 | (2009.01) |

(56) References Cited

U.S. PATENT DOCUMENTS

| | | | |
|---|---|---|---|
| 2011/0171953 A1 | 7/2011 | Faccin et al. | |
| 2011/0205970 A1 | 8/2011 | Suzuki et al. | |
| 2012/0224564 A1* | 9/2012 | Paisal | H04N 7/148 370/331 |
| 2012/0236709 A1* | 9/2012 | Ramachandran | H04W 76/027 370/221 |
| 2013/0010751 A1* | 1/2013 | Rydnell | H04W 36/14 370/331 |
| 2013/0010752 A1* | 1/2013 | Rydnell | H04W 36/0011 370/331 |

OTHER PUBLICATIONS

3GPP TS 23.228 V11.3.0; "3rd Generation Partnership Project; Technical Specification Group Services and System Aspects; IP Multimedia Subsystem (IMS); Stage 2 (Release 11)"; Dec. 2011 (278 pages).

3GPP TS 24.008 V6.2.0; "3rd Generation Partnership Project; Technical Specification Group Core Network; Mobile radio interface Layer 3 specification; Core network protocols; Stage 3 (Release 6)"; Sep. 2003 (485 pages).

3GPP TS 24.301 V8.0.0; "3rd Generation Partnership Project; Technical Specification Group Core Network and Terminals; Non-Access-Stratum (NAS) protocol for Evolved Packet System (EPS); Stage 3 (Release 8)"; Dec. 2008 (221 pages).

Search Report issued in corresponding International Application No. PCT/JP2013/054874, mailed May 7, 2013 (2 pages).

Extended Search Report issued in corresponding European Application No. 13755784.9, mailed Nov. 5, 2015 (9 pages).

Huawei et al.; "Detach procedure with type "re-attach required""; 3GPP TSG CT WG1 Meeting #72, C1-112557; Shanghai, P.R. China; Jun. 27-Jul. 1, 2011 (3 pages).

3GPP TS 29.274 V11.1.0; "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)"; Dec. 2011 (202 pages).

Written Opinion issued in corresponding International Application No. PCT/JP2013/054874, mailed May 7, 2013 (7 pages).

* cited by examiner

COMMUNICATION SYSTEM, MOBILE STATION, AND COMMUNICATION METHOD

TECHNICAL FIELD

The present invention relates to a communication system, a mobile station, and a communication method which enable connection to an access network conforming to the Internet protocol.

BACKGROUND ART

Long Term Evolution (LTE) specifies a system which enables a mobile station (UE) to perform voice over LTE (VoLTE) over an IP-Connectivity Access Network (IP-CAN) by establishing IP-CAN Bearer (SIP bearer) on the IP-CAN. Here, the IP-CAN is an IP access network providing a function of transporting Session Initiation Protocol (SIP) and audio media, and the SIP bearer is a logical communication channel for SIP and audio media (see, for example, Non-patent document 1).

Further, it is specified that if the IP-CAN Bearer is removed for some reason (e.g., handover of a mobile station to UTRAN/GERAN, network-side overloading, and the like), the mobile station executes a procedure for reconnection to the IP-CAN (e.g., Non-patent document 2).

Figure 1:
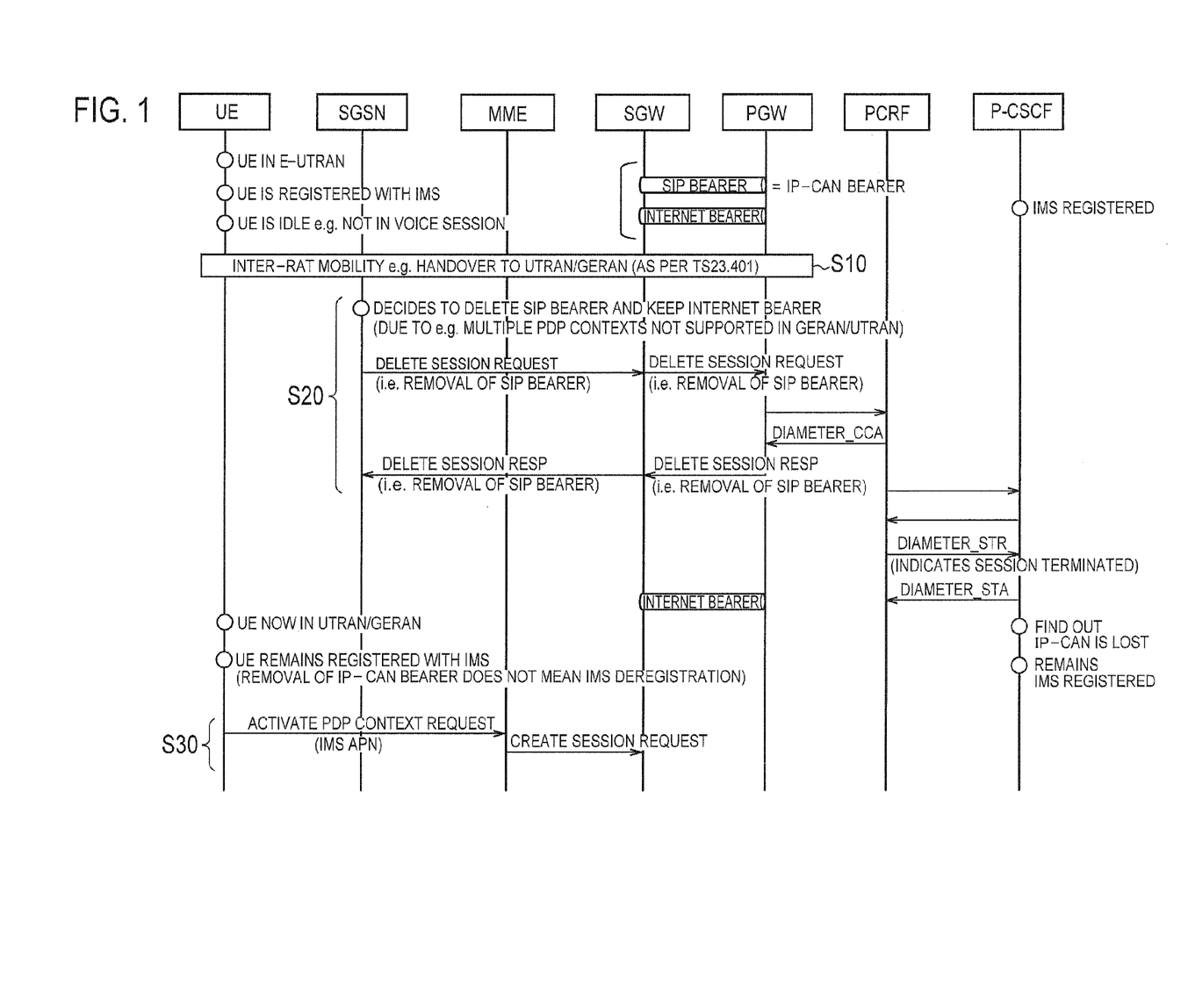
FIG. 1 is a diagram showing a communication sequence performed when IP-CAN bearer is removed in a conventional communication system.

FIG. 1 shows a communication sequence in a case where IP-CAN Bearer established by a mobile station via E-UTRAN (LTE) is removed due to handover (transition) to UTRAN/GERAN which is a different radio access network. As shown in FIG. 1, when the mobile station performs handover to UTRAN/GERAN (S10), the IP-CAN Bearer is removed (removal) (S20). Then, after executing the handover, the mobile station executes a procedure for reconnection to the IP-CAN (S30).

PRIOR ART DOCUMENT

Non-Patent Document

Non-patent document 1: 3GPP TS 24.229 V11.2.1, 3rd Generation Partnership Project; Technical Specification Group Core Network and Terminals; IP multimedia call control protocol based on Session Initiation Protocol (SIP) and Session Description Protocol (SDP); Stage 3 (Release 11), January 2012

Non-patent document 2: 3GPP TS 23.228 V11.3.0, 3rd Generation Partnership Project; Technical Specification Group Services and System Aspects; IP Multimedia Subsystem (IMS); Stage 2 (Release 11), December 2011

SUMMARY OF THE INVENTION

However, the above-described conventional IP-CAN reconnection procedure by a mobile station has the following problem. For example, although the mobile station executes the IP-CAN reconnection procedure as described above when the IP-CAN Bearer is temporarily removed due to handover of the mobile station from E-UTRAN (LTE) to UTRAN/GERAN, the UTRAN/GERAN might not have the capability to provide a bandwidth necessary for the transport of SIP and audio media, or might not support a service (e.g., voice communication using the SIP) provided via IP Multimedia core network Subsystem (IMS) formed by Policy and Charging Rules Function (PCRF), Primary-Call Session Control Function (P-CSCF), and the like.

Even in such cases, the mobile station repeats the reconnection procedure to accomplish the IP-CAN reconnection procedure without exception, and may therefore increase processing load on the IP-CAN wastefully.

The present invention has been made in view of such circumstances and an objective thereof is to provide a communication system, a mobile station, and a communication method capable of suppressing an increase in the processing load on IP-CAN caused by the mobile station attempting reconnection to the IP-CAN via a radio access network not supporting a service provided via IP Multimedia core network Subsystem (IMS).

A first feature of the present invention is summarized as a communication system including: a mobile station connectable to an IP access network conforming to Internet protocol via anyone of a first radio access network supporting a particular service conforming to the Internet protocol and a second radio access network not supporting the particular service conforming to the Internet protocol; and a switch capable of communicating with the particular service conforming to the Internet protocol. Here, the switch includes a connection rejection notification unit configured to transmit a connection rejection notification to the mobile station if the switch receives a request for reconnection to the IP access network from the mobile station via the second radio access network, the connection rejection notification indicating that the mobile station is not connectable to an APN used in the particular service conforming to the Internet protocol, and the mobile station includes a reconnection suspension unit configured to, in a case where the mobile station receives the connection rejection notification from the switch after transitioning from the first radio access network to the second radio access network, suspend transmission of the request for reconnection to the IP access network only if the mobile station is camping in the second radio access network through which the connection rejection notification has been received.

A second feature of the present invention is summarized as a mobile station connectable to an IP access network conforming to Internet protocol via any one of a first radio access network supporting a particular service conforming to the Internet protocol and a second radio access network not supporting the particular service conforming to the Internet protocol, the mobile station including a reconnection suspension unit configured to, in a case where the mobile station receives a connection rejection notification from a switch capable of communicating with the particular service conforming to the Internet protocol after transitioning from the first radio access network to the second radio access network, suspend transmission of a request for reconnection to the IP access network only if the mobile station is camping in the second radio access network through which the connection rejection notification has been received, the connection rejection notification indicating that the mobile station is not connectable to an APN used in the particular service conforming to the Internet protocol.

A third feature of the present invention is summarized communication method executed by a mobile station connectable to an IP access network conforming to Internet protocol via any one of a first radio access network supporting a particular service conforming to the Internet protocol and a second radio access network not supporting the particular service conforming to the Internet protocol, and a switch capable of communicating with the particular service conforming to the Internet protocol, the method including the steps of: the switch transmitting a connection rejection notification to the mobile station upon receiving a request for reconnection to the IP access network from the mobile station via the second radio access network, the connection rejection notification indicating that the mobile station is not connectable to an APN used in the particular service conforming to the Internet protocol, and in a case where the mobile station receives the connection rejection notification from the switch after transitioning from the first radio access network to the second radio access network, the mobile station suspending transmission of the request for reconnection to the IP access network.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Mobile Communication System

Figure 2:
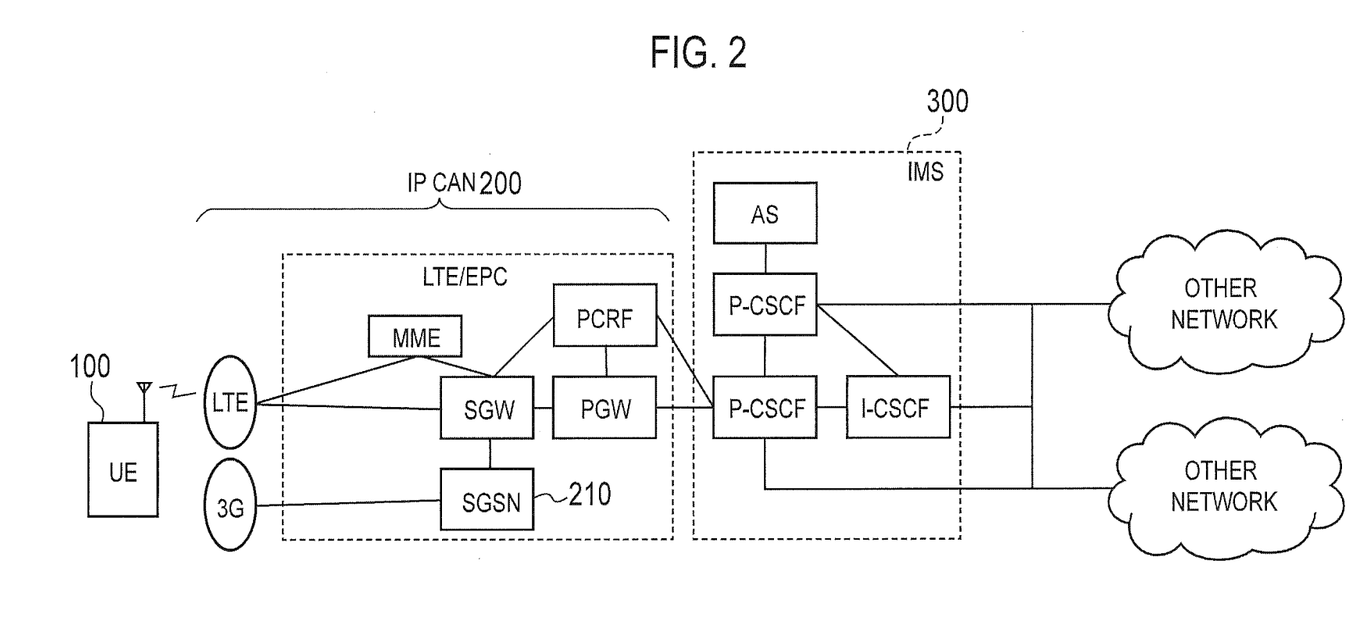
FIG. 2 is an overall schematic configuration diagram of a mobile communication system according to an embodiment of the present invention.

FIG. 2 is an overall schematic configuration diagram of a mobile communication system 10 according to this embodiment. As shown in FIG. 2, the mobile communication system 10 includes a mobile station 100 (UE 100 below), an IP-Connectivity Access Network 200 (IP-CAN 200 below), and an IP Multimedia core network Subsystem 300 (IMS 300 below).

In this embodiment, the UE 100 can perform radio communication conforming to Long Term Evolution (LTE) and 3G (W-CDMA) schemes. The UE 100 is connectable to the IP-CAN 200 in conformity with the LTE or 3G scheme. The UE 100 performs Registration of the UE 100 to the IMS 300 via the IP-CAN 200. For example, the UE 100 can perform registration of the UE 100 to the IMS 300 according to a Registration procedure defined in sections 5.1.1.1 and L3.1.2 of 3GPP TS24.229.

LTE (E-UTRAN) is a radio access network supporting a service provided by the IMS 300 and forms a first radio access network in this embodiment. 3G (UTRAN) is a radio access network not supporting a service provided by the IP multimedia subsystem and forms a second radio access network in this embodiment. The UE 100 is connectable to the IP-CAN 200 via any one of LTE and 3G. Conversely, 3G may be the radio access network supporting the service provided by the IP multimedia subsystem, and LTE may be the radio access network not supporting the service provided by the IP multimedia subsystem.

The IP-CAN 200 is an IP access network conforming to the Internet protocol (IP). Specifically, the IP-CAN 200 is a network providing a function of transferring Session Initiation Protocol (SIP) and audio media, and is equivalent to an LTE/Evolved Packet Core (EPC) network in this embodiment.

The IP-CAN 200 includes a Mobility Management Entity (MME), a Serving Gateway (SGW), a Packet Data Network Gateway (PGW), a Policy and Charging Rules Function (PCRF), and a SGSN (Serving GPRS Support Node) 210 (switch). In this embodiment, the UE 100 and the SGSN 210 form a communication system.

The MME is a switch accommodating an eNodeB (a radio base station) and providing a mobility control function, a bearer control function, and the like. The SGW is a serving packet switch accommodating a 3GPP (LTE) access system. The PGW is a connection node with the base of the IMS and is a packet switch performing allocation of IP addresses, packet transfer to the SGW, and the like. The PGW cooperates with the PCRF to perform QoS control, bearer setting control, and the like. The PCRF is a logical node performing control for charging and QoS of user data transfer. The SGSN is a packet switch accommodating a UTRAN (3G) access system.

The IMS 300 is a multimedia subsystem conforming to the Internet protocol, and includes a Primary-Call Session Control Function (P-CSCF), an Interrogating-Call Session Control Function (I-CSCF), a Serving-Call Session Control Function (S-CSCF), and an Application Server (AS).

The P-CSCF is an SIP relay server placed at a node of connection with the EPC, and not only performs transfer of SIP, but also has functions such as activation of QoS control or check of the status of the IP-CAN Bearer in cooperation with the EPC (PCRF). In addition, other networks (such as a land-line phone network) are connected to the IMS 300.

(2) Functional Block Configuration of the Communication System

Next, a description is given of functional block configurations of the UE 100 and the SGSN 210 forming the communication system in this embodiment.

(2.1) SGSN 210

Figure 3:
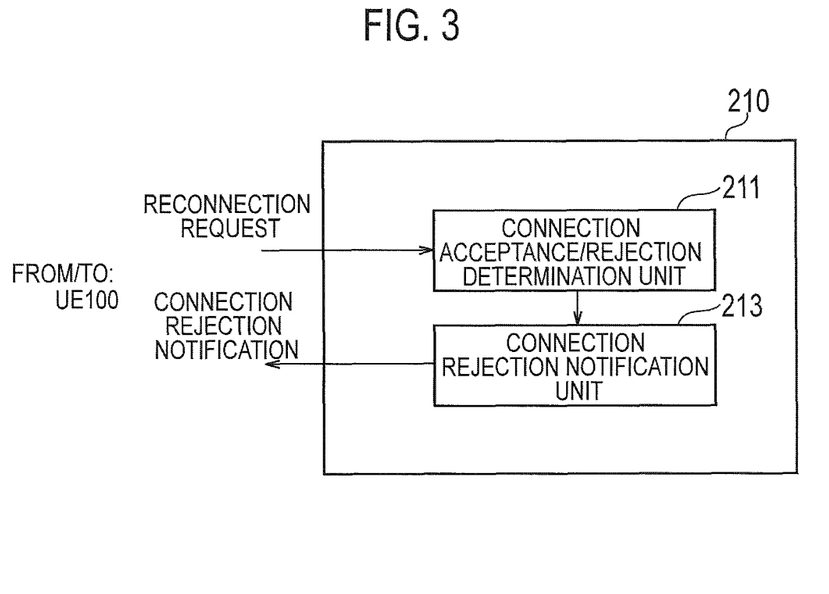
FIG. 3 is a functional block configuration diagram of a switch according to the embodiment of the present invention.

FIG. 3 is a functional block configuration diagram of the SGSN 210. The SGSN 210 is a switch capable of communicating with the IMS 300, and as shown in FIG. 3, the SGSN 210 includes a connection acceptance/rejection determination unit 211 and a connection rejection notification unit 213.

The connection acceptance/rejection determination unit 211 determines whether the UE 100 can be reconnected to the IP-CAN 200 or not if the SGSN 210 receives a request for reconnection to the IP-CAN 200, or specifically, an Activate PDP Context Request (connection target: IMS APN) received from the UE 100. If the request for reconnection to the IP-CAN 200 is received from the UE 100 via 3G (UTRAN), the connection acceptance/rejection determination unit 211 rejects the reconnection of the UE 100 to the IP-CAN 200 since 3G does not support a service provided via the IMS 300 (e.g., voice communication using the SIP). On the other hand, if the request for reconnection to the IP-CAN 200 is received from the UE 100 via LTE (E-UTRAN), the connection acceptance/rejection determination unit 211 accepts the reconnection of the UE 100 to the IP-CAN 200 since LTE supports the service provided via the IMS 300.

Based on a result of the reconnection acceptance/rejection determination made by the connection acceptance/rejection determination unit 211, the connection rejection notification unit 213 transmits a connection rejection notification, or specifically Activate PDP Context Reject, indicating that the UE 100 cannot be connected to the IMS 300, to the UE 100.

More specifically, the connection rejection notification unit 213 transmits the Activate PDP Context Reject to the UE 100 if the request for reconnection to the IP-CAN 200 is received from the UE 100 via 3G. The connection rejection notification unit 213 transmits the Activate PDP Context Reject containing a predetermined Cause Value (e.g., SM Cause #32 (Service Option not supported)) to the UE 100. The Cause Value does not have to be #32, but may be, for example, #27 (Missing/Unknown APN), #31, or the like.

(2.2) UE 100

Figure 4:
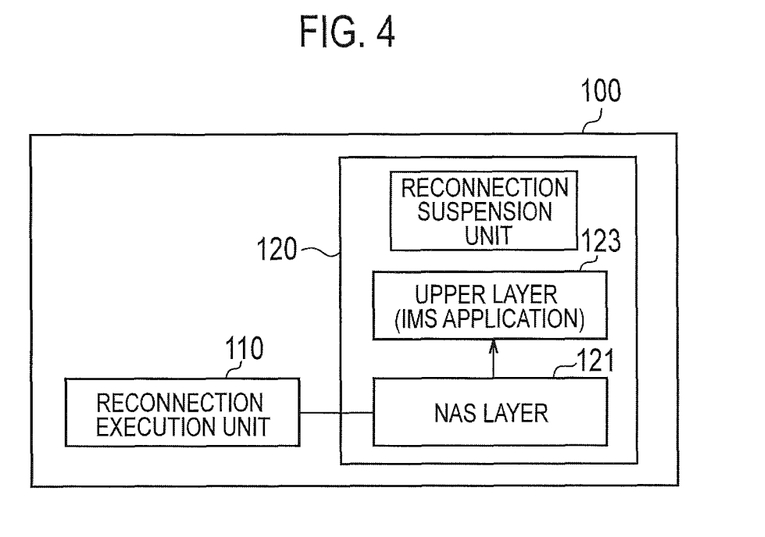
FIG. 4 is a functional block configuration diagram of a mobile station according to the embodiment of the present invention.

FIG. 4 is a functional block diagram of the UE 100. As shown in FIG. 4, the UE 100 includes a reconnection execution unit 110 and a reconnection suspension unit 120.

The reconnection execution unit 110 executes reconnection to the IP-CAN 200. Specifically, when IP-CAN Bearer is removed for some reason, the reconnection execution unit 110 transmits Activate PDP Context Request (connection target: APN of the IMS) to the SGSN 210 and executes reconnection to the IP-CAN 200, the IP-CAN Bearer being a logical communication channel established between the UE 100 and the PGW constituting the IP-CAN 200.

In this embodiment in particular, the reconnection execution unit 110 attempts reconnection to the IP-CAN 200 even when the UE 100 is camping in 3G after transitioning from LTE to 3G. Note that the transition includes handover and redirection from LTE to 3G.

The reconnection suspension unit 120 suspends transmission of the request for reconnection to the IP-CAN 200 by the reconnection execution unit 110. Specifically, in a case where the UE 100 receives a connection rejection notification (Activate PDP Context Reject) from the SGSN 210 after transitioning from LTE to 3G, the reconnection suspension unit 120 suspends transmission of the request for reconnection to the IP-CAN 200. Note that the reconnection suspension unit 120 suspends the transmission of the request for reconnection to the IP-CAN 200 only if the UE 100 is camping in 3G through which the connection rejection notification has been received.

In this embodiment, the reconnection suspension unit 120 includes a Non-Access-Stratum layer 121 (a NAS layer 121 hereinbelow) and an upper layer 123 located at a level higher than the NAS layer 121.

The NAS layer 121 receives the connection rejection notification from the SGSN 210. The upper layer 123 is specifically an IMS application, and is configured to set the IMS 300 to a Deregistered state based on the connection rejection notification received from the NAS layer 121. In other words, use of the service provided by the IMS 300 is suspended when the upper layer 123 sets the IMS 300 to the Deregistered state.

Further, the NAS layer 121 may suspend the transmission of the request for reconnection to the IP-CAN 200 while the UE 100 maintains connection to 3G. In other words, as long as the UE 100 is kept connected to the same radio access network, the NAS layer 121 does not execute reconnection to the IP-CAN, the reconnection to which is rejected by the SGSN 210.

(3) Operation of the Communication System

Figure 5:
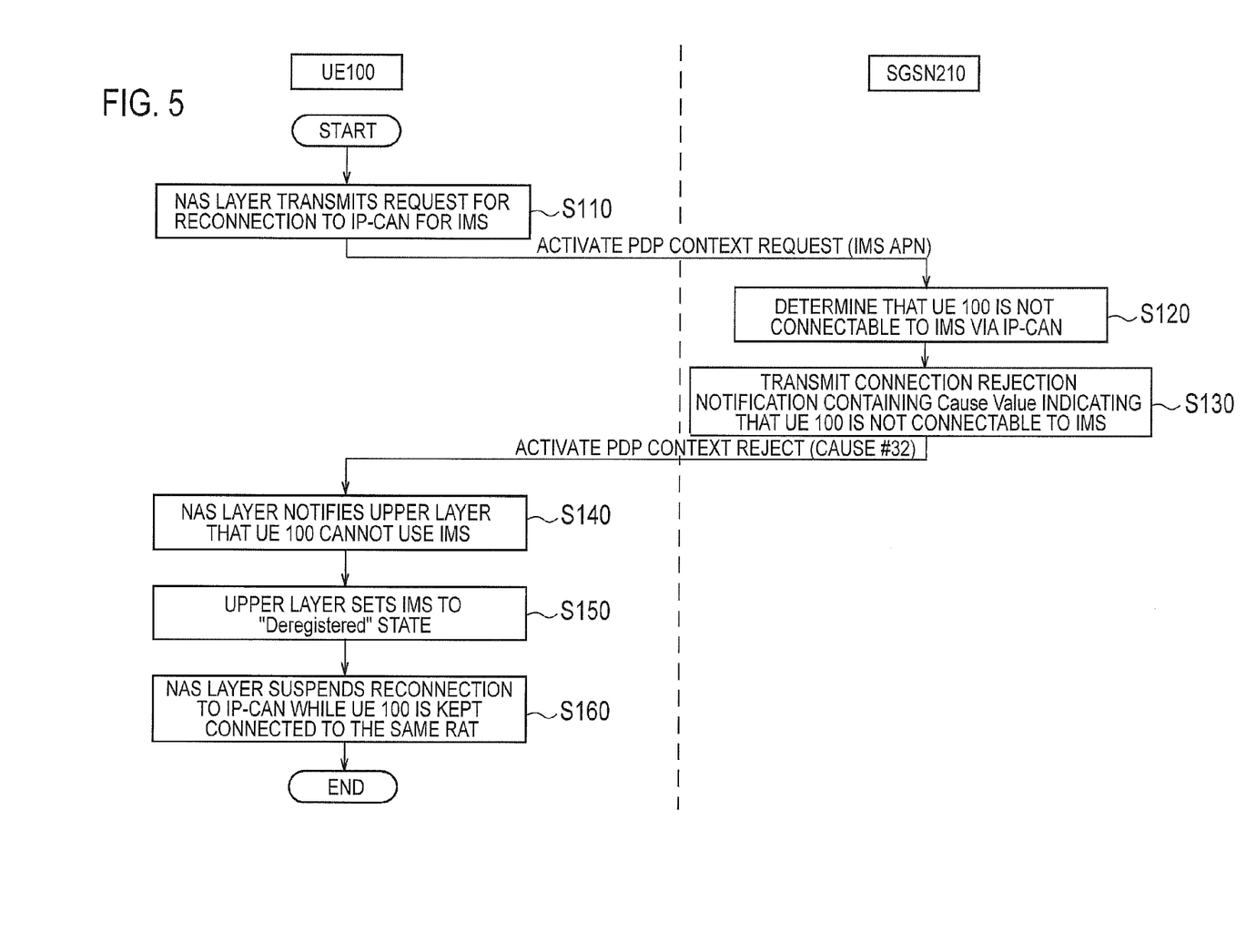
FIG. 5 shows a flow of operation of the communication system according to the embodiment of the present invention.

FIG. 5 shows a flow of operation performed by the UE 100 and the SGSN 210 in suspending reconnection to the IP-CAN 200.

As shown in FIG. 5, the UE 100, or specifically the NAS layer 121, transmits a request for reconnection to the IP-CAN for the IMS (the IP-CAN 200) (S110). More specifically, the NAS layer 121 transmits Activate PDP Context Request (connection target: APN of the IMS) to the SGSN 210. Note that it is assumed here that the UE 100 has transitioned from LTE to 3G and is camping in 3G.

Upon receipt of the Activate PDP Context Request, the SGSN 210 determines that the UE 100 cannot be connected to the IMS 300 via the IP-CAN since the UE 100 is being connected to 3G (S120). Hence, the SGSN 210 transmits a connection rejection notification indicating that the UE 100 cannot be connected to the IMS 300, to the UE 100 (S130). Specifically, the SGSN 210 transmits Activate PDP Context Reject (Cause #32) containing a predetermined Cause Value (Cause #32) to the UE 100.

If the UE 100 receives the Activate PDP Context Reject, the NAS layer 121 of the UE 100 notifies the upper layer 123 that the US 100 cannot use the IMS 300 (S140).

Having being notified that the US 100 cannot use the IMS 300, the upper layer 123 sets the IMS 300 to a Deregistered state (S150). Further, the NAS layer 121 suspends reconnection to the IP-CAN 200 while the UE 100 is camping in the same radio access network (RAT), specifically 3G (S160). More specifically, the NAS layer 121 suspends transmission of the Activate PDP Context Request.

(4) Advantageous Effects

According to the UE 100 and the SGSN 210 described above, when the UE 100 receives a connection rejection notification (Activate PDP Context Reject) from the SGSN 210 after transitioning from LTE to 3G, transmission of a request for reconnection to the IP-CAN 200 (Activate PDP Context Request) is suspended. This can suppress an increase in the processing load on the IP-CAN 200 caused by the UE 100 attempting reconnection to the IP-CAN 200 via the radio access network (3G) not supporting the service provided by the IMS 300.

Moreover, in this embodiment, while the UE 100 is camping in 3G, transmission of the request for reconnection to the IP-CAN 200 can be suspended. This therefore can further suppress an increase in the processing load on the IP-CAN 200 caused by the UE 100 attempting reconnection to the IP-CAN 200.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the example described in the above embodiment, UTRAN (3G) is the radio access network not supporting the service provided by the IP multimedia subsystem. However, instead of UTRAN, the radio access network not supporting the service provided by the IMS may be GERAN (2G), E-UTRAN (LTE), or a mobile communication system using other radio communication technique.

Note that, in a case of E-UTRAN (LTE), the SGSN 210 in the above embodiment may be replaced with an MME. In this case, the signal sent by the UE 100 to the MME is not Active PDP Context, but PDN Connectivity Request, and a signal returned from the MME to the UE 100 is PDN Connectivity Reject. In this case, the UE 100 suspends transmission of the request for reconnection to the IP-CAN 200 while the UE 100 is camping in LTE.

In addition, although the reconnection suspension unit 120 is formed by the NAS layer 121 and the upper layer 123 in the above embodiment, such a configuration is not necessarily essential. For example, the NAS layer 121 may be configured to suspend use of a service provided by the IMS 300. Additionally, although the SGSN 210 transmits the connection rejection notification in the above embodiment, other device (e.g., the SGW) may transmit the connection rejection notification to the UE 100.

The features of the above-described embodiment may also be expressed as follows. A first feature of the present invention is summarized as a communication system including: an UE 100 (mobile station) connectable to an IP-CAN 200 (IP access network) conforming to Internet protocol via any one of a first radio access network supporting a service provided by an IMS 300 (IP Multimedia core network Subsystem) conforming to the Internet protocol and a second radio access network not supporting the service by the IP Multimedia core network Subsystem; and a switch capable of communicating with the IP Multimedia core network Subsystem. Here, the switch includes a connection rejection notification unit 213 (connection rejection notification unit) configured to transmit a connection rejection notification to the mobile station if the switch receives a request for reconnection to the IP access network from the mobile station via the second radio access network, the connection rejection notification indicating that the mobile station is not connectable to the IP Multimedia core network Subsystem, and the mobile station includes a reconnection suspension unit 120 (reconnection suspension unit) configured to suspend transmission of the request for reconnection to the IP access network in a case where the mobile station receives the connection rejection notification from the switch after transitioning from the first radio access network to the second radio access network.

In the above-described first feature of the present invention, the reconnection suspension unit may include a NAS layer 121 (NAS layer) configured to receive the connection rejection notification from the switch, and an upper layer 123 (upper layer) configured to set the IP multimedia subsystem to a Deregistered state based on the connection rejection notification received from the NAS layer.

In the above-described first feature of the present invention, the reconnection suspension unit may suspend the transmission of the request for reconnection to the IP access network while the mobile station maintains connection to the second radio access network.

A second feature of the present invention is summarized as an UE 100 (mobile station) connectable to an IP access network conforming to Internet protocol via any one of a first radio access network supporting a service by an IP Multimedia core network Subsystem conforming to the Internet protocol and a second radio access network not supporting the service by the IP Multimedia core network Subsystem, the mobile station including a reconnection suspension unit configured to, in a case where the mobile station receives a connection rejection notification from a switch capable of communicating with the IP Multimedia core network Subsystem after transitioning from the first radio access network to the second radio access network, suspend transmission of a request for reconnection to the IP access network only if the mobile station is camping in the second radio access network through which the connection rejection notification has been received, the connection rejection notification indicating that the mobile station is not connectable to the IP Multimedia core network Subsystem.

A third feature of the present invention is summarized as a communication method executed by an UE 100 (mobile station) connectable to an IP access network conforming to Internet protocol via any one of a first radio access network supporting a service by an IP Multimedia core network Subsystem conforming to the Internet protocol and a second radio access network not supporting the service by the IP Multimedia core network Subsystem, and a SGSN 210 (switch) capable of communicating with the IP Multimedia core network Subsystem, the method including the steps of: the switch transmitting a connection rejection notification to the mobile station upon receiving a request for reconnection to the IP access network from the mobile station via the second radio access network, the connection rejection notification indicating that the mobile station is not connectable to the IP Multimedia core network Subsystem, and in a case where the mobile station receives the connection rejection notification from the switch after transitioning from the first radio access network to the second radio access network, the mobile station suspending transmission of the request for reconnection to the IP access network.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2012-045977 (filed on Mar. 1, 2012) is incorporated by reference in the present specification.

INDUSTRIAL APPLICABILITY

According to the aspects of the present invention, the present invention can provide a communication system, a mobile station, and a communication method capable of suppressing the processing load on an IP-CAN caused by the mobile station attempting reconnection to the IP-CAN via a radio access network not supporting a service provided by an IP Multimedia core network Subsystem (IMS).

EXPLANATION OF THE REFERENCE NUMERALS

10 mobile communication system
100 UE
110 reconnection execution unit
120 reconnection suspension unit
121 NAS layer
123 upper layer
200 IP-CAN
210 SGSN
211 connection acceptance/rejection determination unit
213 connection rejection notification unit
300 IMS

The invention claimed is:

1. A communication system comprising:
a mobile station connectable to an IP access network conforming to Internet protocol via any one of a first radio access network supporting a particular service conforming to the Internet protocol and a second radio access network not supporting the particular service conforming to the Internet protocol; and a switch capable of communicating with the particular service conforming to the Internet protocol, wherein the switch includes a connection rejection notification unit configured to transmit a connection rejection notification to the mobile station if the switch receives a request for reconnection to the IP access network from the mobile station via the second radio access network, the connection rejection notification indicating that the mobile station is not connectable to an APN used in the particular service conforming to the Internet protocol, and the mobile station includes a reconnection suspension unit configured to, in a case where the mobile station receives the connection rejection notification from the switch after transitioning from the first radio access network to the second radio access network, suspend transmission of the request for reconnection to the IP access network only if the mobile station is camping in the second radio access network through which the connection rejection notification has been received.

2. The communication system according to claim 1, wherein
the particular service conforming to the Internet protocol is an IP multimedia subsystem.

3. The communication system according to claim 2, wherein
the reconnection suspension unit includes
a NAS layer configured to receive the connection rejection notification from the switch, and
an upper layer configured to set the IP multimedia subsystem to a Deregistered state based on the connection rejection notification received from the NAS layer.

4. The communication system according to claim 1, wherein
the reconnection suspension unit suspends the transmission of the request for reconnection to the IP access network while the mobile station is camping in the second radio access network.

5. A mobile station connectable to an IP access network conforming to Internet protocol via any one of a first radio access network supporting a particular service conforming to the Internet protocol and a second radio access network not supporting the particular service conforming to the Internet protocol,
the mobile station comprising a reconnection suspension unit configured to, in a case where the mobile station receives a connection rejection notification from a switch capable of communicating with the particular service conforming to the Internet protocol after transitioning from the first radio access network to the second radio access network, suspend transmission of a request for reconnection to the IP access network only if the mobile station is camping in the second radio access network through which the connection rejection notification has been received, the connection rejection notification indicating that the mobile station is not connectable to an APN used in the particular service conforming to the Internet protocol.

6. The mobile station according to claim 5, wherein
the particular service conforming to the Internet protocol is an IP multimedia subsystem.

7. The mobile station according to claim 6, wherein
the reconnection suspension unit includes
a NAS layer configured to receive the connection rejection notification from the switch, and
an upper layer configured to set the IP multimedia subsystem to a Deregistered state based on the connection rejection notification received from the NAS layer.

8. The mobile station according to claim 5, wherein
the reconnection suspension unit suspends the transmission of the request for reconnection to the IP access network while the mobile station is camping in the second radio access network.

9. A communication method executed by
a mobile station connectable to an IP access network conforming to Internet protocol via any one of a first radio access network supporting a particular service conforming to the Internet protocol and a second radio access network not supporting the particular service conforming to the Internet protocol, and
a switch capable of communicating with the particular service conforming to the Internet protocol, the method comprising the steps of:
transmitting, by the switch, a connection rejection notification to the mobile station upon receiving a request for reconnection to the IP access network from the mobile station via the second radio access network, the connection rejection notification indicating that the mobile station is not connectable to an APN used in the particular service conforming to the Internet protocol, and
in a case where the mobile station receives the connection rejection notification from the switch after transitioning from the first radio access network to the second radio access network, suspending, by the mobile station, transmission of the request for reconnection to the IP access network.

10. The communication method according to claim 9, wherein
the particular service conforming to the Internet protocol is an IP multimedia subsystem.

* * * * *